United States Patent [19]

Sayles

[11] 4,154,141

[45] May 15, 1979

[54] ULTRAFAST, LINEARLY-DEFLAGRATION IGNITION SYSTEM

[75] Inventor: David C. Sayles, Huntsville, Ala.

[73] Assignee: The United States of America as represented by the Secretary of the Army, Washington, D.C.

[21] Appl. No.: 799,043

[22] Filed: May 17, 1977

[51] Int. Cl.² ............................................. F42B 33/02
[52] U.S. Cl. ...................................... 86/1 R; 60/256; 264/3R
[58] Field of Search ........................... 60/256; 149/22; 102/49.7; 264/3 R, 36; 86/1 R, 20 D

[56] References Cited

U.S. PATENT DOCUMENTS

| | | | |
|---|---|---|---|
| 2,995,091 | 8/1961 | Haymes et al. | 60/255 |
| 3,126,305 | 3/1964 | Armstrong | 149/22 X |
| 3,132,475 | 5/1964 | Hopper | 60/256 X |
| 3,421,325 | 1/1969 | Thibodaux | 60/256 X |

Primary Examiner—Harold J. Tudor
Attorney, Agent, or Firm—William G. Gapcynski; Werten F. W. Bellamy; Jack W. Voigt

[57] ABSTRACT

Disclosed is a method of providing an ingition system for substantially simultaneously and uniformily igniting all the internal burning surfaces of a large propellant grain of the internal burning grain type that is employed in an upper stage advanced missile interceptor. The propellant grain to be ignited is also of the type which requires support for reinforcing the grain during high acceleration loads especially before the interceptor stage motor is pressurized. The means for igniting the large propellant grain is comprised of high-velocity deflagration compositions which are derived from cesium dodecahydrodecaborane and which are extruded or formed in a variety of shapes. These shaped high-velocity deflagration compositions are then bonded to a consumable casting mandrel, or to a grain support tube which also serves as a casting mandrel. The casting mandrel is inserted into the rocket motor case; the propellant formulation is then cast into the rocket motor; and the cast formulation is cured to form a grain for an upper stage rocket motor for an advanced interceptor. The shaped cesium dodecahydrodecaborane can be ignited through a perforation in the grain suppot tube or when used with a consumable mandrel, the shaped cesium dodecahydrodecaborane can be provided with a cavity into which an initiator can be inserted and bonded in place with an adhesive. The initiator when ignited serves to ignite the high-velocity deflagration composition which subseqently ignites the advanced interceptor grain with which the shaped cesium dodecahydrodecaborane is in intimate contact.

1 Claim, 4 Drawing Figures

ULTRAFAST, LINEARLY-DEFLAGRATION IGNITION SYSTEM

DEDICATORY CLAUSE

The invention described herein may be manufactured, used, and licensed by or for the Government for governmental purposes without the payment to me of any royalties thereon.

BACKGROUND OF THE INVENTION

The design of an ignition system for a solid propellant rocket motor generally requires that an adequate pressure build up take place in a metal component for the igniter mix to be injected into the propellant's perforation to accomplish ignition. An effect associated with rocket motor ignition is termed: "ignition-induced pressure waves". This effect is more prevalent when ignition takes place at a rate which is less than that rate required for simultaneously and uniformly igniting the propellant.

Most propellant grains are readily ignited by a typical igniter or squib. The typical igniter or squib is comprised of the basic elements which include a bridgewire, an explosive charge contained in a cup which has an open or an end which contains an easily ruptured baffle which is directed towards the propellant grain, and lead wires which are encased in a sealer plug for the cup. An electrical source is connected to the lead wires which supplies the proper amperes to the bridgewire for firing.

Variations of propellant igniters or squibs have been designed to meet the requirements for a particular rocket motor. For example, one squib is comprised of pyrotechnic black powder encased in a thin plastic cup with the open end directed towards the propellant grain for aft-end ignition. This type igniter is referred to as an aft-end packaged igniter which is used on the TOW missile. Other igniter types include: a jelly-roll or tubular igniter, as used in Little John; a head-end packaged igniter, as used on various spin motors; and a head-end pyrogenic igniter, as used on the HERCULES sustainer.

Transient analysis of typical advanced interceptor motors indicated that conventional ignition systems, such as, pyrogens and pyrotechnic igniters could be used to ignite low-altitude commit, interceptor-type, first-stage motors and gain up to 75% of maximum pressure in less than 0.05 second. However, the very high acceleration forces acting on the second-stage makes the use of a grain support tube necessary, and this means that the conventional ignition systems cannot be used for igniting the second stage motor since it would prevent the igniter gases from impinging on the propellant's surface. The requirements for a grain support tube was verified in advanced interceptor propulsion subsystem design studies. The design studies confirmed that a grain support tube would be necessary to prevent the second-stage propellant grain from being extruded out the nozzle during first-stage operation. It must be emphasized that this support tube needs to be perforated so that it can remain in place permanently. As a result, when the propellant undergoes ignition, its exhaust gases are ported through the perforations in the support tube, and then flow down the perforation on the inside of the support tube and inside the propellant grain. There have been similar methods for reinforcing the propellant grain developed, such as, foamed mandrels, frangible mandrels, etc. These were mainly intended to eliminate the need for the casting mandrel which would not have to be pulled after the propellant had been cured. This type of mandrel would fill the entire propellant's perforation, be left in place, and then blown out on ignition of the grain. The primary purpose of these mandrels was to reduce the cost of rocket motor manufacture, and would be particularly practical for small motors which would be produced in volume quantities.

Thus a supporting tube or a supporting mandrel is one way of meeting the requirements for offsetting the effect of high axial acceleration; however, this is not to be confused also with the use and functions of prior art propellant traps for rocket motors. The use of traps to merely retain propellants within the combustion chamber of a rocket motor is well known. For example, as disclosed in U.S. Pat. No. 2,605,607 issued to C. N. Hickman on Aug. 5, 1952, traps were used to retain sticks of powder employed as propellant in rocket motor combustion chamber. Without the traps to retain the propellant, pieces of propellant would be discharged out the nozzle and would result in loss of total thrust, wide pressure variations out the nozzle, and possibly failure of the rocket motor if restriction of the nozzle became too great. Ignition of the sticks of powder was accomplished by an igniting element mounted within the interior of the trap member.

The present invention relates to a method of ignition of the solid propellant grain in the second stage motor of an advanced interceptor. The advanced interceptor has required the development of propellant grains having ultrahigh burning rates. One way to achieve ultrahigh burning rates, other than by modification of the chemical composition of the propellant, is to design grains having the desired web thickness and with a proper design of the central perforation to achieve the desired burning pattern and rates. However, the described combination has resulted in a propellant having inadequate mechanical properties unless compensated for by employing a support tube for the propellant grain. The high acceleration rates of the interceptor creates problems because of the inadequacy of the mechanical properties of the propellant. The unsupported propellant grain tends to flow, and break-up of the propellant grain occurs under acceleration loads, especially before the motor is pressurized—a condition which exists during the period when the first stage or booster of the interceptor is operating. A perforated support tube is the answer to the problem of providing reinforcement to the propellant grain, and thus, serves to prevent propellant flow and propellant break-up. However, the use of such a support tube rules out the conventional methods of igniting solid propellant grains.

Therefore, an object of this invention is to provide a method of igniting a solid propellant grain that employs a perforated support tube or a consumable mandrel for supporting the grain.

Another object of this invention is to provide a method for igniting a perforated tube supported propellant grain to accomplish a more simultaneously and uniformly igniting of the propellant grain to thereby eliminate the ignition-induced pressure waves.

A further object of this invention is to provide an ignition system for igniting a perforated tube supported propellant grain which provides greater control and ease of manufacture and predictability of the ignition system.

SUMMARY OF THE INVENTION

The method of this invention employs high-velocity, deflagration compositions derived from cesium dodecahydrodecaborane which have linear burning rates of 5000-ips to 47,000-ips. The main ignition system, therefore, does not involve the use of hardware comparable to a pyrogen ignition system. The cesium dodecahydrodecaborane ignition system is fabricated by extruding the material in a variety of shapes. These shapes are then bonded to a consumable casting mandrel, or to the grain support tube, and the propellant formulation is cast into the rocket motor and cured to a grain.

An alternate method would be to bond the shapes to a removable casting mandrel coated with a release agent or a parting agent to facilitate the removal of the mandrel after the propellant is cast and cured. The consumable mandrel to be inserted, is preferably a rigid foamed material which has supporting strength but is readily consumed or broken up and blown out the nozzle when rapid ignition occurs. The foamed consumable mandrel of proper size and configuration is inserted to support the propellant grain in flight, but is easily removed after ignition. At this time the support is no longer required since pressurization prevent deformation of grain.

The cesium dodecahydrodecaborane can be extruded with or without a binder material, preferably a binder material, if used, should be of the same type used in the cast propellant formulation since the cast propellant is cured to the extruded shapes. Since a binder will reduce the burning rate of the extruded shaped pieces, a binder is preferred to be used if a lower burning rate ignition system is used. The burning rate will be reduced substantially in proportion to the percentage of the binder used.

BRIEF DESCRIPTION OF THE DRAWING

Reference is now made to the drawing accompanying this application wherein.

DESCRIPTION OF THE PREFERRED EMBODIMENT(S)

A perforated support tube which is preferably constructed of filament-wound graphite is employed to support the propellant grain of the second stage rocket motor of an advanced interceptor. However, the newly acquired function, in accordance with this invention, of a perforated support tube is to support an extruded, shaped material of cesium dodecahydrodecaborane which is bonded to the support tube. The perforated support tube with the bonded shapes of cesium dodecahydrodecaborane is then positioned in a rocket motor case and held in place with a spider. The propellant formulation is cast and cured to the cesium dodecahydrodecaborane which is supported by the perforated support tube. Igniters or squibs which are bonded in place in one or more of the perforations at the aft end of the support tube near the nozzle and in contact with the cesium dodecahydrodecaborane, serves to ignite the cesium dodecahydrodecaborane which is the linearly-deflagration igniter for the propellant grain.

After ignition of the cesium dodecahydrodecaborane and the propellant grain, the resulting combustion gases are ported through the many perforations in the support tube. The combustion gases then travel down the inside of (i.e. through the hollow portion) the support tube, and out the nozzle. Because of the extremely high burning rate of cesium dodecahydrodecaborane which serves as the ultrafast linearly-deflagrating ignition system, ignition of the second stage propellant grain is accomplished substantially simultaneously and uniformly.

An alternate embodiment employs a consumable mandrel which supports the grain until ignition; at this time, the consumable mandrel readily deforms and is consumed or blown out the exhaust nozzle.

Figure 1:
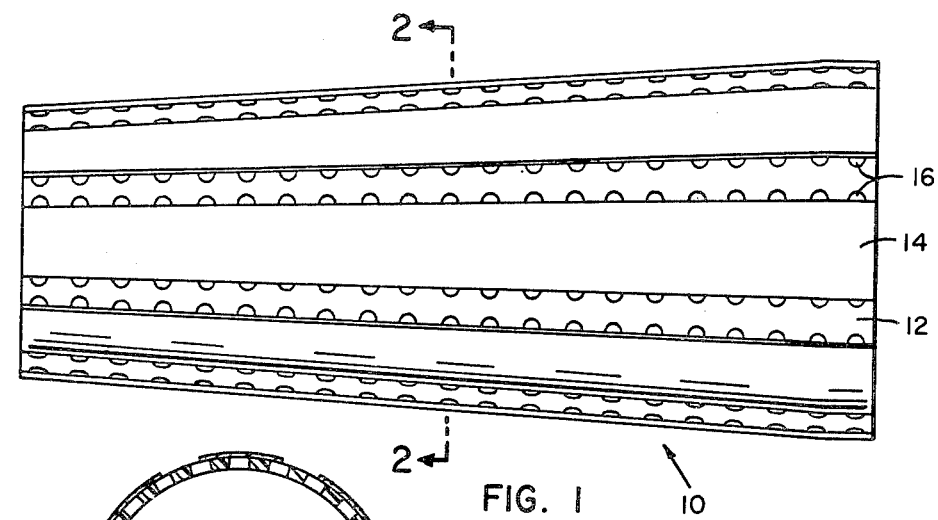
FIG. 1 is a side view of a propellant grain, perforated support tube in the form of a hollow truncated cone with a tapered, perforated wall which shows an extruded, shaped section of a linearly-deflagrating igniter bonded to the support tube wall.

In further reference to the figures of the drawing, FIG. 1 depicts a side view of selected parts of a second stage rocket motor 10 which include a perforated grain support tube 12 with an extruded, shaped igniter material comprised of cesium dodecahydrodecaborane 14 bonded to the grain support tube having a plurality of perforations 16. Not shown is an igniter or squib for igniting the extruded, shaped. cesium dodecahydrodecaborane. A squib or a plurality of squibs can be positioned in perforations underneath the shaped igniter and secured in place with epoxy cement.

Figure 2:
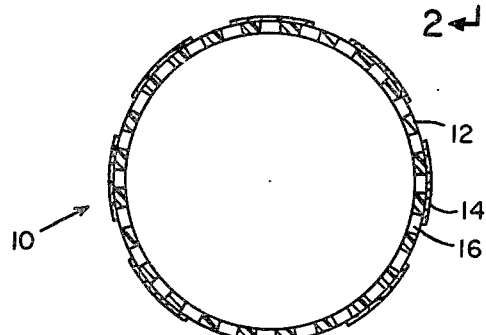
FIG. 2 is a sectional view taken along line 2—2 of FIG. 1.

FIG. 2 depicts the selected parts of a second stage rocket motor with numbers as previously shown in FIG. 1, but viewed along lines 2—2 of FIG. 1.

Figure 3:
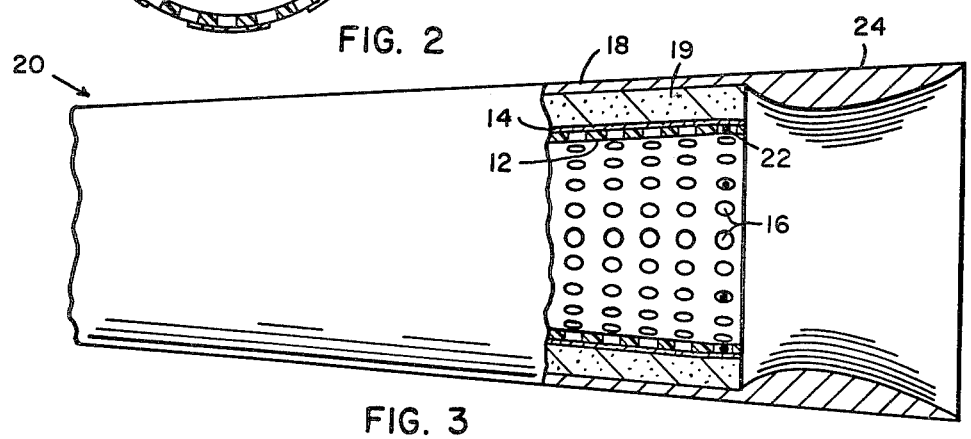
FIG. 3 is a partial section of diagrammatic view of one embodiment of a second stage of an advanced interceptor rocket motor containing a perforated support tube with an extruded, shaped linearly-deflagration igniter bonded thereto which ignites the cast and cured solid propellant grain.

FIG. 3 depicts a second stage rocket motor 20 which includes the selected parts thereof as shown in FIG. 1 with like numbers as previously assigned but additionally showing a rocket motor case 18, a propellant grain 19, an igniter means 22 positioned in a plurality of the perforations at the aft end of the grain support tube for igniting the cesium dodecahydrodecaborane, and a rocket nozzle 24.

Figure 4:
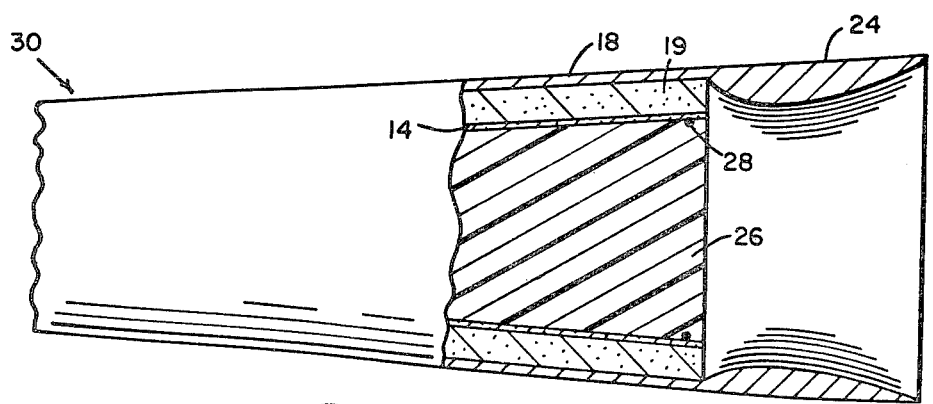
FIG. 4 is a sectional diagrammatic view of another embodiment of a second stage of an advanced interceptor rocket motor containing a consumable mandrel with an extruded, shaped, linearly-deflagration igniter bonded thereto which ignites the cast and cured solid propellant grain.

FIG. 4 depicts an alternate embodiment which depicts a rocket motor 30 having the like parts with numbers as previously assigned in FIG. 1 and FIG. 3 but additionally showing a consumable foamed mandrel 26 for use instead of the perforated grain support tube for supporting the propellant grain, and an igniter means 28 positioned at the aft end of the consumable mandrel and in contact with the cesium dodecahydrodecaborane for igniting the same.

The high-velocity deflagrating compositions derived from cesium dodecahydrodecaborane can be easily produced in a variety of shapes, e.g., in cords, extrusions, grains and powders. The properties of the cesium dodecahydrodecaborane include a burning rate of 5000-ips to 47,000- ips as compared to high explosives whose burning rates range from 315,000- ips to 118,000- ips. It also has a Heat of Explosion of 400–900 Cal/g, a combustion flame temperature of 2000°–3500° K., and a vacuum specific impulse of about 169 lbf-s/lbm. Thus, the properties of this material meets the criteria required for an ignition system which requires an extremely rapid propagation of ignition in the axial direction to avoid the production of localized ignition and subsequent pressure waves which would be amplified in a nonlinear manner by the propellant's burning rate dependence on pressure and result in catastrophic failure of the motor.

The product referred to as HIVELITE, which is manufactured by Teledyne-McCormick-Selph, and R&N Associates, both of Hollister, California, can be used as the high-velocity deflagrating composition of this invention.

The critical factors which influence the design of an ignition system for the second-stage include:
(1) Ignition delay time must be very short,
(2) Ignition system weight must be minimum,
(3) The propellant's high burning rate exponent results in a slow pressure rise rate in the motor, and
(4) The grain support tube cannot interfere with the functioning of the igniter.

The ignition system as disclosed hereinabove can be employed with any size motor by employing variations in design. The evaluation of the combination including a perforated grain support tube indicated that adequate gas flow would be obtained if the sum of the areas of the holes were approximately twice the cross-sectional area of the nozzle throat. The ignition system of this invention meet the criteria for its area of use.

I claim:
1. A method of providing an ignition system for substantially simultaneously and uniformly igniting all the internal burning surfaces of a large solid propellant grain which has been cast and cured for use as an upper stage rocket motor designed with an internal burning grain configuration for an advanced missile interceptor, said large propellant grain because of the inadequancy of its mechanical properties requiring a supporting means to prevent flow and break up of the propellant grain under acceleration loads especially before said upper stage rocket motor is pressurized, said method comprising:
 (i) providing said supporting means that is in the form of a casting mandrel having the geometry of a hollow, truncated cone with a tapered, perforated wall;
 (ii) bonding a plurality of extruded, shaped sections of a linearly-deflagrating igniters comprised of cesium dodecahydrodecaborane to said supporting means;
 (iii) positioning said supporting means that has a plurality of said extruded, shaped sections of a linearly-deflagrating igniters bonded thereto within a rocket motor case of said upper stage rocket motor;
 (iv) casting an uncured solid propellant formulation into said rocket motor case and curing to form a solid propellant grain that is in contact with the said extruded, shaped sections of the linearly-deflagrating igniters; and,
 (v) placing an initiator in contact with one or more of said extruded, shaped sections of the linearly-deflagrating igniters to provide for aft end ignition which when initiated causes a combination reaction to proceed in said igniters at a linear burning rate from about 5000 inches per second to about 47,000 inches per second to substantially simultaneously and uniformily ignite all of the internal burning surfaces of said large solid propellant grain, said combustion reaction producing combustion gases from said igniters and said large solid propellant grain which are ported through perforations in the wall of said supporting means and discharged through the hollow portion of the supporting means and out of the rocket motor nozzle.

* * * * *